(12) United States Patent
Halliwill

(10) Patent No.: US 9,429,493 B2
(45) Date of Patent: Aug. 30, 2016

(54) MANIFOLD ASSEMBLY FOR A PORTABLE LEAK TESTER

(71) Applicant: Cinetic Automation, Farmington Hills, MI (US)

(72) Inventor: Kenneth Halliwill, Farmington Hills, MI (US)

(73) Assignee: Cinetic Automation, Farmington Hills, MI (US)

( * ) Notice: Subject to any disclaimer, the term of this patent is extended or adjusted under 35 U.S.C. 154(b) by 303 days.

(21) Appl. No.: 14/084,742

(22) Filed: Nov. 20, 2013

(65) Prior Publication Data

US 2015/0135803 A1     May 21, 2015

(51) Int. Cl.
*G01M 3/16* (2006.01)
*G01M 3/00* (2006.01)
*G01M 3/32* (2006.01)

(52) U.S. Cl.
CPC .............. *G01M 3/16* (2013.01); *G01M 3/002* (2013.01); *G01M 3/3254* (2013.01); *G01M 3/3263* (2013.01); *G01M 3/3272* (2013.01)

(58) Field of Classification Search
CPC .... G01M 3/002; G01M 3/16; G01M 3/3254; G01M 3/3263; G01M 3/3272
USPC ............................................................ 73/40
See application file for complete search history.

(56) References Cited

U.S. PATENT DOCUMENTS

| 6,640,614 | B1* | 11/2003 | Bode | G01M 3/3272 73/1.01 |
| 6,923,043 | B2* | 8/2005 | Rabelle | G01M 3/3227 73/40 |
| 7,490,625 | B1* | 2/2009 | Johnson | G01M 3/3236 137/596.16 |
| 2005/0056081 | A1* | 3/2005 | Gocho | G01M 3/2815 73/40 |
| 2005/0241384 | A1* | 11/2005 | Stephens | G01M 3/3254 73/167 |

* cited by examiner

*Primary Examiner* — Daniel S Larkin
(74) *Attorney, Agent, or Firm* — Quinn Law Group, PLLC

(57) ABSTRACT

A manifold assembly for a portable leak tester includes a manifold housing defining a fluid inlet, a fluid outlet, a pressure port, and a fluid passage. The fluid passage connects the fluid inlet, the pressure port, and the fluid outlet in fluid communication. A supply control valve is mounted to the manifold housing. The supply control valve is operable to open and close fluid communication through the fluid passage, between the fluid inlet and the fluid outlet. A pressure transducer is coupled to the pressure port. The pressure transducer is operable to sense a fluid pressure in the fluid passage. A manifold controller is mounted to and supported by the manifold housing, and is in communication with the supply control valve and the pressure transducer. The manifold controller includes all software and hardware necessary to control the supply control valve, the pressure transducer, and to communicate with a testing controller.

23 Claims, 3 Drawing Sheets

MANIFOLD ASSEMBLY FOR A PORTABLE LEAK TESTER

TECHNICAL FIELD

The invention generally relates to a portable leak tester for detecting a leak in a pressurized object, and more specifically to a manifold assembly for the portable leak tester.

BACKGROUND

Leak testing systems are used to detect leaks in objects. For example, a hydraulic system must be completely sealed, without any fluid leakage during operation, in order to function properly. Accordingly, a leak testing system may be used to test for any leaks in the hydraulic system prior to final assembly of the hydraulic system. While the hydraulic system is noted as an exemplary use of leak testing systems, it should be appreciated that the leak testing systems may be used on other systems and/or objects that must remain completely sealed while under pressure, without any fluid leakage therefrom.

The leak testing systems may use any of several different methods to test for leaks, such as but not limited to a pressure decay test procedure, a mass flow test procedure, or a differential pressure decay test procedure. Leak testing often includes connecting the test object to a pressurized gas, typically air. A manifold assembly may be used to connect the test object to the pressurized gas. The manifold assembly includes several valves and fittings that allow easy connection to the pressurized gas and the test object, as well as one or more valves that control the flow of the pressurized gas. The manifold assembly may also include sensors and/or gauges for measuring the pressure of the gas and or the flow rate of the gas.

SUMMARY

A portable leak tester is provided. The portable leak tester includes a moveable cart, and a testing controller mounted on the cart. A manifold assembly is connected to a test part, and communicates with the testing controller. The manifold assembly includes a manifold housing. The manifold housing defines a fluid inlet, a fluid outlet, a pressure port, and a fluid passage. The fluid passage connects the fluid inlet, the pressure port, and the fluid outlet in fluid communication. The pressure port is disposed between the fluid inlet and the fluid outlet. A supply control valve is mounted to and supported by the manifold housing. The supply control valve is operable to open and close fluid communication through the fluid passage, between the fluid inlet and the fluid outlet. The supply control valve is disposed between the fluid inlet and the pressure port. A pressure transducer is coupled to the pressure port. The pressure transducer is operable to sense a fluid pressure in the fluid passage, at the pressure port, between the supply control valve and the fluid outlet. A manifold controller is mounted to and supported by the manifold housing. The manifold controller is connected to and in electrical communication with the supply control valve and the pressure transducer. The manifold controller includes all software and hardware necessary to control opening and closing of the supply control valve, operation of the pressure transducer, and to communicate information sensed by the pressure transducer to the testing controller. The testing controller includes all software and hardware necessary to control and communicate with the manifold controller.

Accordingly, the manifold assembly may be directly attached to a test object, or attached very near to the test object, which reduces the volume between the test object and the manifold assembly. Reducing the volume between the manifold assembly and the test object reduces the volume being tested, which lowers cycle testing time, temperature variations, and increases testing accuracy. Because the manifold controller includes all software and hardware necessary to control the supply control valve and the pressure transducer, the manifold controller only requires a communication link to the testing controller, which may be supplied, for example, by an Ethernet cable or by a wireless connection. As such, individual control and communication wires are not required between the testing controller and the supply control valve, or between the testing controller and the pressure transducer.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
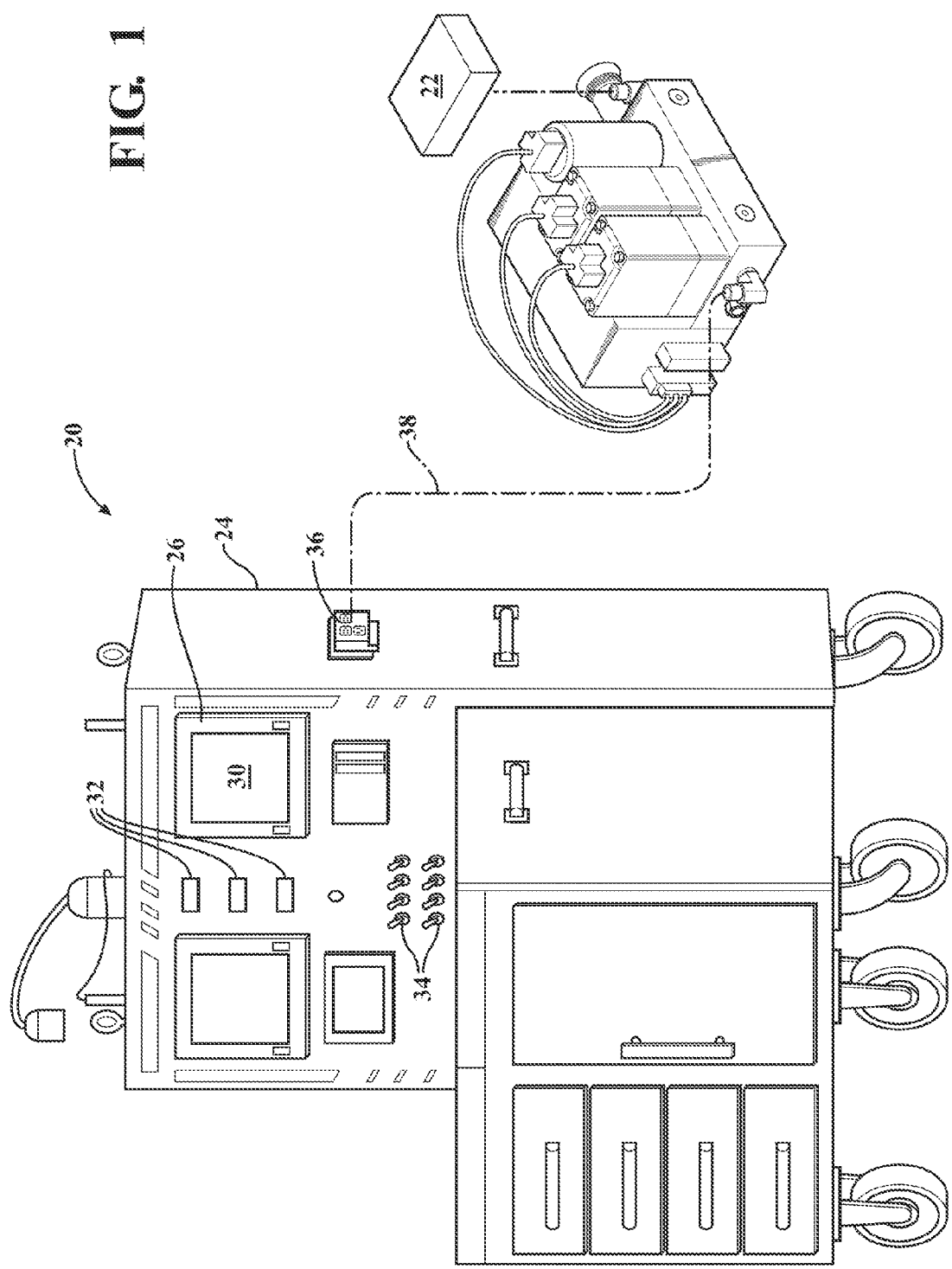
FIG. 1 is a schematic perspective view of a portable leak tester.

Referring to the Figures, wherein like numerals indicate like parts throughout the several views, a portable leak tester is generally shown at 20 in FIG. 1. The portable leak tester 20 is operable to test for leaks in sealed objects, such as but not limited to hydraulic systems, tanks, etc. The leak tester 20 is a portable unit that includes all equipment necessary to connect to and test different test objects 22 for leaks. The leak tester 20 may be configured and equipped, for example, to use a pressure decay test procedure, a mass flow test procedure, or a differential pressure decay test procedure to test for leaks, all of which are briefly described in detail below. Additionally, it should be appreciated that the leak tester 20 may be configured and equipped to perform some other test procedure capable of identifying a leak in a sealed test object 22.

The pressure decay test procedure supplies air through a valve out to the test object 22 at a regulated test pressure. After a fill time, the valve is shut off. The leak tester 20 will go through a stabilize step, which allows the air to stabilize and stop moving. When the test goes from the stabilize step into the test step, the leak tester 20 measures pressure loss over the test period. This pressure loss is then converted to a leak value using calibration and compensation values. The disadvantage of the pressure decay test procedure is that temperature plays a large part in the pressure reading. It also has a problem in that based on the part volume and the small size of the leaks that are being measured (often less than 12 sccm), the pressure loss is often very, very small (<0.010 psi).

The mass flow test procedure supplies constant air through a valve out to the test object 22 at a regulated test pressure. The mass flow test procedure typically uses three stages: a fill stage, a stabilize stage, and a test stage. The leak tester 20 keeps the air supply on through all three stages. The leak tester 20 continually monitors a flow meter, which measures air moving through the flow meter (typically through an ancillary port which measures temperature variation very accurately converting that to air flow). This is straight air flow, which may be referred to as the leak rate. Unlike conventional pressure decay or differential pressure leak test procedures, both of which pressurize the test cavity, measure loss of pressure across two points in time, and then calculate flow or leak rates based on that loss, the mass flow leak procedure directly reads the air flow or leakage in a single point measurement, with no calculation. In most cases, this makes mass flow leak testing faster and more reliable for leak rates down to 1 sccm, minimizing the influence of uncontrollable variables in the test environment. When dealing with small leak rates (<5 sccm); the response of the flow meter is long. The mass flow test procedure is typically used for large volumes or larger leak rates. Temperature does not affect the reading unless the test object 22 drastically changes temperature during the test procedure.

The differential pressure decay test procedure is very similar to the pressure decay test procedure. The leak tester 20 includes both a gauge pressure transducer and a differential pressure transducer. Both the test object 22 and a reference port (typical left as just a cap on the front of the differential pressure transducer) is filled with test pressure air. After stabilization, an equalization valve is turned on isolating the differential transducer, so that it reads the difference in pressure from the test object 22 vs. the referenced port. The advantage of this is that rather than reading a "high test pressure", it only monitors the difference between the two ports. This simulates an amplifier for the pressure reading (particularly when dealing in pressure readings as low as 0.003 psi). The differential pressure decay test procedure allows an accurate measurement of pressure differential.

Referring to FIG. 1, the portable leak tester 20 includes a moveable cart 24, which supports the various components of the leak tester 20. The cart may be sized and/or shaped in any suitable manner, and includes wheels to allow for easy transportation between different test objects 22. Accordingly, the portable leak tester 20 may be easily moved between different locations of a facility to test different test objects 22.

The leak tester 20 includes a testing controller 26, which is mounted onto and supported by the cart. Alternatively, the testing controller 26 may be fixedly mounted to a bench, or other stationary fixture. The testing controller 26 includes all software and hardware necessary to control and communicate with a manifold assembly 28 (described in greater detail below). For example, the testing controller 26 may include, but is not limited to, a windows based computer having software operable thereon for operating and controlling a manifold controller 62. The testing controller 26 may further include other devices, such as but not limited to an input/output LCD touch screen 30 for both inputting information into the testing controller 26, and visually outputting information to an operator, various gauges 32, electrical inputs 34, data communication ports 36, etc. The leak tester 20 may further include a tank (not shown) for storing a gas, such as argon or helium, and may further include an air compressor (not shown) for supplying compressed air.

Figure 2:
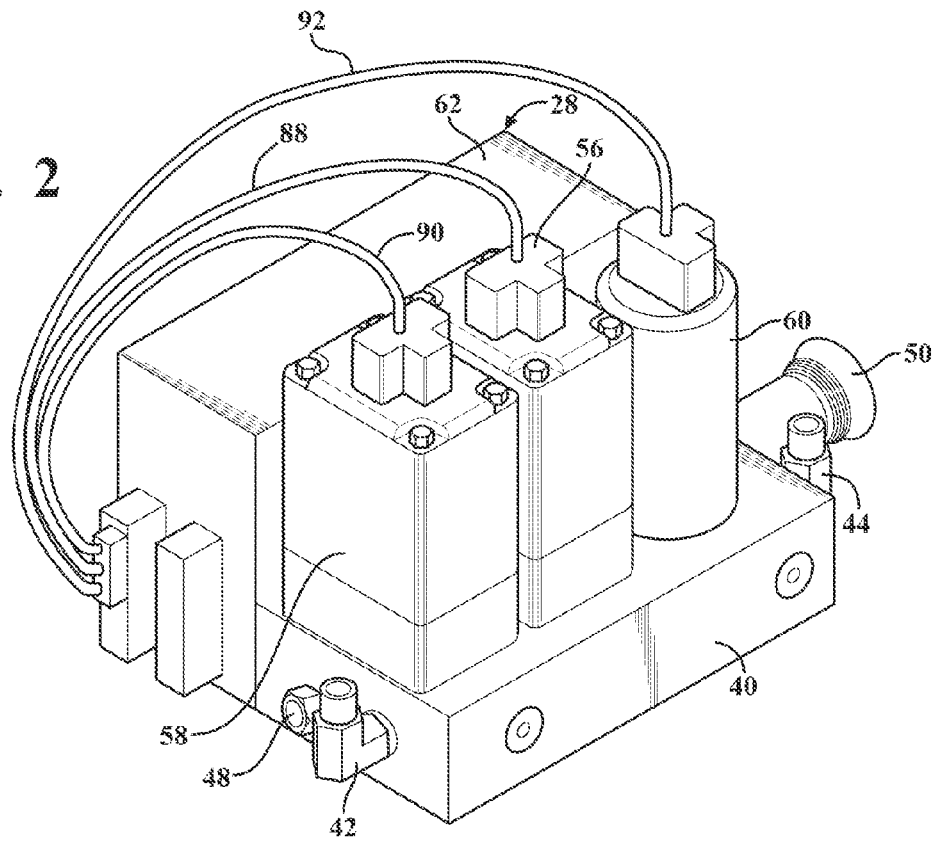
FIG. 2 is a schematic perspective view of a manifold assembly of the portable leak tester.
Figure 3:
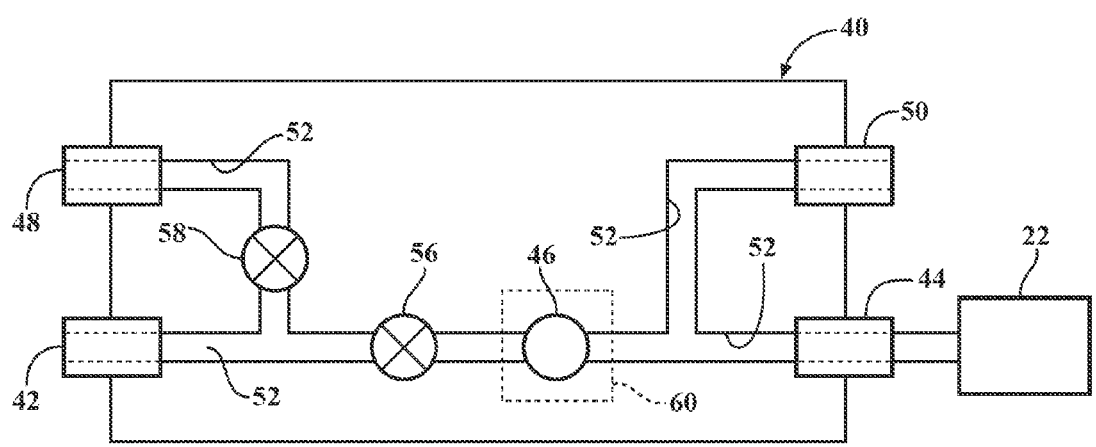
FIG. 3 is a schematic diagram of the manifold assembly.

As shown in FIG. 1, the manifold controller 62 is in communication with the testing controller 26 through either a communication connection device 38, such as but not limited to an Ethernet cable or a wireless network connection. Referring to FIGS. 2 and 3, the manifold assembly 28 includes a manifold housing 40. The manifold housing 40 is configured for connection to the test object 22, at or immediately adjacent to the test object 22. The most common gas used for leak testing is air. For all practical purposes, air reacts as a perfect gas. This means that in the general gas law, PV=MRT, R=1. Therefore, the combination of relationships expressed by Boyle's law and Charles' law reduce to:

$$\frac{(P1)(V1)}{T1} = \frac{(P2)(V2)}{T2}$$

which means that air reacts directly with its absolute pressure and inversely to its absolute temperature. This equation shows that both volume and temperature have a large effect on the leak rate of the test object 22. By connecting the manifold housing 40 to the test object 22, at or immediately adjacent the test object 22, the volume of air within the test system is reduced, which also reduces heat (lower volume reduces the amount of air, which lowers the amount of friction caused by the air moving through long lines of tubing).

The manifold housing 40 defines a fluid inlet 42, a fluid outlet 44, a pressure port 46, a bleed port 48, a calibration port 50, and a fluid passage 52 connecting the fluid inlet 42, the pressure port 46, the bleed port 48, the calibration port 50, and the fluid outlet 44 in fluid communication. As used herein, the term "fluid" should be understood to include one or both of a liquid and a gas. Accordingly, while several of the components are identified with the "fluid" descriptor, it should be appreciated that these various components may operate with either a liquid or a gas. For example, it should be appreciated that the fluid passage 52 provides a communication or flow path that may be used by either a liquid or a gas. Preferably, the manifold housing 40 is formed from a block of aluminum, and the fluid passage 52 is at least partially defined by a plurality of bores machined into the manifold housing 40. The bores machined into the manifold housing 40 are interconnected in fluid communication to define a continuous fluid flow path. As such, it should be appreciated that the fluid passage 52 is formed from multiple segments that are connected in fluid communication.

A supply control valve 56 is mounted to and supported by the manifold housing 40. The supply control valve 56 is operable to open and close fluid communication through the fluid passage 52. The supply control valve 56 is disposed between the fluid inlet 42 and the fluid outlet 44 to control fluid flow from the fluid inlet 42 to the fluid outlet 44. More specifically, the supply control valve 56 is disposed between the fluid inlet 42 and the pressure port 46. The bleed port 48 is disposed in fluid communication with the fluid passage 52, between the fluid inlet 42 and the supply control valve 56. A bleed valve 58 is mounted to and supported by the manifold housing 40. The bleed valve 58 is disposed between the fluid inlet 42 and the supply control valve 56.

The bleed valve 58 is operable to open and close fluid communication through the fluid passage 52, between the bleed port 48 and the fluid inlet 42. The bleed valve 58 is disposed in fluid communication with the fluid passage 52, between the fluid inlet 42 and the bleed port 48, to control fluid flow from the fluid inlet 42 to the bleed port 48. The bleed valve 58 may be replaced with an orifice of known size having a fixed flow rate. The pressure port 46 is disposed between the fluid inlet 42 and the fluid outlet 44, and more specifically, between the supply control valve 56 and the fluid outlet 44. The calibration port 50 is disposed in fluid communication with the fluid passage 52, between the pressure port 46 and the fluid outlet 44.

The supply control valve 56 and the bleed valve 58 are each a zero leakage valve, sometimes referred to as a bubble tight valve. As used herein, the term zero leakage valve includes, but is not limited to, a valve with a Class VI classification under ANSI/FCI 70-2-2006 standards, FCI-70-2 standards, and/or IEC 60534-4 standards, or that otherwise completely prevents leakage therethrough. Both of the supply control valve 56 and the bleed valve 58 are actuated by an electrical signal.

A pressure transducer 60 is coupled to the pressure port 46. The pressure transducer 60 is operable to sense a fluid pressure in the fluid passage 52, at the pressure port 46, between the supply control valve 56 and the fluid outlet 44. The pressure transducer 60 is mounted to and supported by the manifold housing 40. The pressure transducer 60 may include any sensor capable of sensing a fluid pressure within the fluid passage 52. The pressure sensitivity of the pressure transducer 60 is capable of reading pressures down to a level of 0.0001 psi, with a minimum 14 bit analog to digital resolution capability (i.e., $2^{14}$). The pressure transducer 60 also includes a frequency read capability of a minimum of 1000 Hz.

The fluid inlet 42 defines an inlet port for introducing a compressed or pressurized gas, such as air, into the manifold housing 40. Accordingly, the fluid inlet 42 is configured for connection to a supply of pressurized gas, and may include suitable fittings for making such a connection. The fluid outlet 44 defines an exhaust or outlet port for the manifold housing 40. The fluid outlet 44 is configured for connection to the test object 22, and may include suitable fittings for making such a connection. Accordingly, when the supply control valve 56 is open, pressurized gas introduced into the fluid inlet 42, may flow through the fluid passage 52 and exit the manifold assembly 28 through the fluid outlet 44, thereby pressurizing the test object 22 connected to the fluid outlet 44. When the supply control valve 56 is closed, pressurized gas may not flow between the fluid inlet 42 and the fluid outlet 44. When the bleed valve 58 is closed, none of the pressurized gas in the fluid passage 52 may exit the manifold assembly 28 via the bleed port 48. However, when the bleed valve 58 is open, pressurized gas may be bled from the fluid passage 52, through the bleed port 48. The calibration port 50 may include a quick connect fitting attached thereto, so that a certified orifice (which permits a defined or set amount of bleed) may leak pressurized gas in order to have a known pressure loss which equates to a leak. As such, the calibration port 50 may be used to validate the accuracy of the leak tester 20.

A manifold controller 62 is mounted to and supported by the manifold housing 40. The manifold controller 62 is connected to and in electrical communication with the supply control valve 56, the bleed valve 58, and the pressure transducer 60. The manifold controller 62 includes all software and hardware necessary to control opening and closing of the supply control valve 56, opening and closing of the bleed valve 58, operation of the pressure transducer 60, and to communicate information sensed by the pressure transducer 60 to the testing controller 26.

Figure 4:
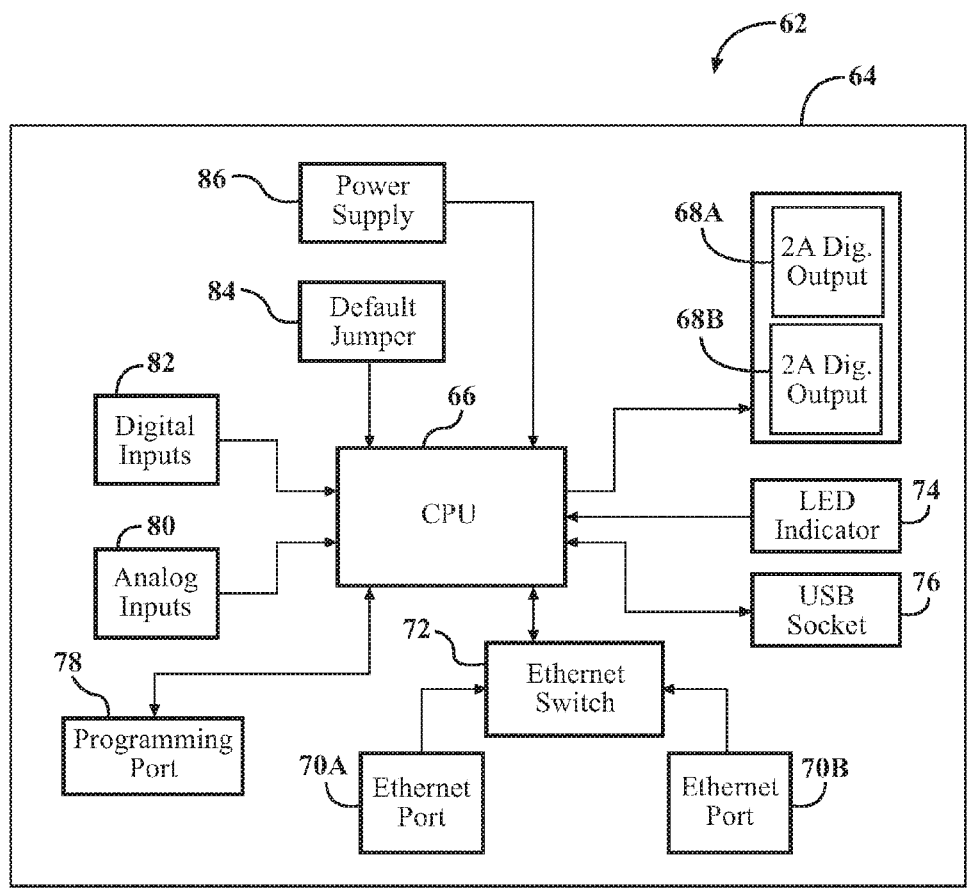
FIG. 4 is a schematic architectural block diagram of a manifold controller of the manifold assembly.

The manifold controller 62 includes a printed circuit board 64, which supports and connects various different components of the manifold controller 62. Referring to FIG. 4, the manifold controller 62 includes a central processing unit 66, and at least one, 2-amp digital output 68. Preferably, the manifold controller 62 includes a first 2-amp digital output 68 dedicated to the supply control valve 56, and a second t-amp digital output 68 dedicated to the bleed valve 58. The manifold controller 62 may include additional, 2-amp digital outputs 68 to accommodate future expansion and/or alternative uses. The pressure transducer(s) 60, up to two of which can be 0-10 vdc, +/−5 vdc, or 0-20 ma, are mounted into one of the fluid ports, and are wired directly into the printed circuit board 64 of the manifold controller 62.

The manifold controller 62 further includes at least one Ethernet port 70. Preferably, the manifold controller 62 includes a first Ethernet port 70A dedicated to communication with the testing controller 26, and a second Ethernet port 70B for connecting to other devices, such as an additional manifold assembly 28. An Ethernet switch 72 may interconnect the first Ethernet port 70A and the second Ethernet port 70B with the printed circuit board 64. The manifold controller 62 may further include various LED indicators 74, a USB socket 76, and a programming port 78, various analog inputs 80, various digital inputs 82, a restore default jumper 84, and a power supply 86. The various components of the manifold controller 62 are attached to and supported by the printed circuit board 64, and are electronically connected to the central processing unit 66 by the printed circuit board 64.

As noted above, the manifold controller 62 includes the first digital output 68A, (2-amp digital output 68) which interconnects the manifold controller 62 and the supply control valve 56, and the second digital output 68B, (2-amp digital output 68) which interconnects the manifold controller 62 and the bleed valve 58. The first digital output 68A and the second digital output 68B are operable to carry an electrical control signal having a current between the range of 0.5 and 2 amps. Both of the supply control valve 56 and the bleed valve 58 require an electrical signal of greater than 0.5 amps, and less than 2 amps, to actuate between respective open and closed positions. Accordingly, the digital outputs 68 dedicated to the supply control valve 56 and the bleed valve 58 must be able to accommodate the required control signal.

A first valve electrical connector 88, shown in FIG. 2, connects the manifold controller 62 and the supply control valve 56. More specifically, the first valve electrical connector 88 is coupled to the supply control valve 56 and the first digital output 68A. A second valve electrical connector 90, shown in FIG. 2, connects the manifold controller 62 and the bleed valve 58. More specifically, the second valve electrical connector 90 is coupled to the bleed valve 58 and the second digital output 68B. A transducer electrical connector 92, shown in FIG. 2, connects the manifold controller 62 and the pressure transducer 60.

Because the manifold controller 62 is located on the manifold housing 40 with each of the supply control valve 56, the bleed valve 58, and the pressure transducer 60, each of the first valve electrical connector 88, the second valve electrical connector 90, and the transducer electrical connector 92 may include a length that is less than 6 inches. The maximum preferred distance between the manifold controller 62 and the supply control valve 56, the bleed valve 58, and the pressure transducer 60 is 24 inches. Although the manifold controller 62 may be placed farther away from the supply control valve 56, the bleed valve 58, and the pressure transducer 60, up to a distance of 10 feet, reducing the distance allows the system to reduce analog and electrical noise, and reduces volume which reduces heat. Because of the short length of the first valve electrical connector 88, the second valve electrical connector 90, and the transducer electrical connector 92, the electrical interference and/or resistance between the manifold controller 62 and the supply control valve 56, the bleed valve 58, and the pressure transducer 60 is reduced, thereby improving control of each.

The communication connection device 38 interconnects the testing controller 26 and the manifold controller 62. The communication connection device 38 allows the manifold assembly 28 to be remotely located relative to the moveable cart 24. The communication connection device 38 may include an Ethernet cable interconnecting the testing controller 26 and the manifold controller 62, or alternatively, may include a wireless network connection interconnecting the testing controller 26 and the manifold controller 62. It should be appreciated that the communication connection device 38 may include some other device mot specifically noted herein, that is capable of providing communication between the testing controller 26 and the manifold controller 62.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A portable leak tester comprising:
    a moveable cart;
    a testing controller mounted on the cart; and
    a manifold assembly in communication with the testing controller, the manifold assembly including:
        a manifold housing defining a fluid inlet, a fluid outlet, a pressure port, and a fluid passage connecting the fluid inlet, the pressure port, and the fluid outlet in fluid communication, wherein the pressure port is operatively disposed between the fluid inlet and the fluid outlet;
        a supply control valve mounted to and supported by the manifold housing, and operable to open and close fluid communication through the fluid passage, between the fluid inlet and the fluid outlet, wherein the supply control valve is operatively disposed between the fluid inlet and the pressure port;
        a pressure transducer coupled to the pressure port and operable to sense a fluid pressure in the fluid passage at the pressure port, wherein the pressure transducer senses a fluid pressure between the supply control valve and the fluid outlet; and
        a manifold controller mounted to and supported by the manifold housing, and connected to and in electrical communication with the supply control valve and the pressure transducer, wherein the manifold controller includes all software and hardware necessary to control opening and closing of the supply control valve, operation of the pressure transducer, and to communicate information sensed by the pressure transducer to the testing controller;
        wherein the testing controller includes software and hardware necessary to control and communicate with the manifold controller.

2. The portable leak tester set forth in claim 1 further comprising a communication connection device interconnecting the testing controller and the manifold controller, wherein the communication connection device allows the manifold assembly to be remotely located relative to the moveable cart.

3. The portable leak tester set forth in claim 2 wherein the communication connection device includes an ethernet cable interconnecting the testing controller and the manifold controller.

4. The portable leak tester set forth in claim 2 wherein the communication connection device includes a wireless network connection interconnecting the testing controller and the manifold controller.

5. The portable leak tester set forth in claim 1 wherein the manifold controller includes at least one 2-amp digital output interconnecting the manifold controller and the supply control valve, wherein the at least one 2-amp digital output connecting the manifold controller and the supply control valve is operable to carry an electrical control signal having a current between 0.5 and 2 amps.

6. The portable leak tester set forth in claim 1 further comprising:
    a valve electrical connector connecting the manifold controller and the supply control valve; and
    a transducer electrical connector connecting the manifold controller and the pressure transducer;
    wherein each of the valve electrical connector and the transducer electrical connector includes a length that is less than 12 inches.

7. The portable leak tester set forth in claim 1 wherein the pressure transducer is mounted to and supported by the manifold housing.

8. The portable leak tester set forth in claim 1 wherein the manifold housing defines a bleed port disposed in fluid communication with the fluid passage, between the fluid inlet and the supply control valve.

9. The portable leak tester set forth in claim 8 further comprising a bleed valve mounted to and supported by the manifold housing, and operable to open and close fluid communication through the fluid passage, between the fluid inlet and the bleed port.

10. The portable leak tester set forth in claim 9 wherein the manifold controller includes at least one 2-amp digital output interconnecting the manifold controller and the bleed valve, wherein the at least one 2-amp digital output connecting the manifold controller and the bleed valve is operable to carry an electrical control signal having a current between 0.5 and 2 amps.

11. A manifold assembly for a portable leak tester, the manifold assembly comprising:
    a manifold housing defining a fluid inlet, a fluid outlet, a pressure port, and a fluid passage connecting the fluid inlet, the pressure port, and the fluid outlet in fluid communication, wherein the pressure port is operatively disposed between the fluid inlet and the fluid outlet;
    a supply control valve mounted to and supported by the manifold housing, and operable to open and close fluid communication through the fluid passage, between the fluid inlet and the fluid outlet, wherein the supply control valve is operatively disposed between the fluid inlet and the pressure port;

a pressure transducer coupled to the pressure port and operable to sense a fluid pressure in the fluid passage at the pressure port, wherein the pressure transducer senses fluid pressure between the supply control valve and the fluid outlet; and a manifold controller mounted to and supported by the manifold housing, and connected to and in electrical communication with the supply control valve and the pressure transducer, wherein the manifold controller includes software and hardware necessary to control opening and closing of the supply control valve, operation of the pressure transducer, and to communicate information sensed by the pressure transducer to a testing controller.

12. The manifold assembly set forth in claim 11 wherein the manifold controller includes at least one 2-amp digital output interconnecting the manifold controller and the supply control valve, wherein the at least one 2-amp digital output connecting the manifold controller and the supply control valve is operable to carry an electrical control signal having a current between 0.5 and 2 amps.

13. The manifold assembly set forth in claim 11 further comprising:
a valve electrical connector connecting the manifold controller and the supply control valve; and
a transducer electrical connector connecting the manifold controller and the pressure transducer;
wherein each of the valve electrical connector and the transducer electrical connector includes a length that is less than 12 inches.

14. The manifold assembly set forth in claim 11 wherein the pressure transducer is mounted to and supported by the manifold housing.

15. The manifold assembly set forth in claim 11 wherein the supply control valve is a zero leakage valve.

16. The manifold assembly set forth in claim 11 wherein the manifold housing defines a bleed port disposed in fluid communication with the fluid passage, between the fluid inlet and the supply control valve.

17. The manifold assembly set forth in claim 16 further comprising a bleed valve mounted to and supported by the manifold housing, and operable to open and close fluid communication through the fluid passage, between the fluid inlet and the bleed port.

18. The manifold assembly set forth in claim 17 wherein the manifold controller includes at least one, 2-amp digital output interconnecting the manifold controller and the bleed valve, wherein the at least one, 2-amp digital output connecting the manifold controller and the bleed valve is operable to carry an electrical control signal having a current between 0.5 and 2 amps.

19. The manifold assembly set forth in claim 17 wherein the bleed valve includes a zero leakage valve.

20. The manifold assembly set forth in claim 11 wherein the manifold housing defines a calibration port disposed in fluid communication with the fluid passage, between the pressure port and the fluid outlet.

21. The manifold assembly set forth in claim 11 wherein the manifold controller includes:
a printed circuit board;
a central processing unit attached to and supported by the printed circuit board;
at least one, 2-amp digital output attached to and supported by the printed circuit board, and electronically connected to the central processing unit by the printed circuit board; and
at least one Ethernet port attached to and supported by the printed circuit board, and electronically connected to the central processing unit by the printed circuit board.

22. The manifold assembly set forth in claim 11 wherein the fluid passage is at least partially defined by a plurality of bores machined into the manifold housing, and interconnected in fluid communication to define a continuous fluid flow path.

23. A manifold assembly for a portable leak tester, the manifold assembly comprising:
a manifold housing defining a fluid inlet, a fluid outlet, a pressure port, a bleed port, and a fluid passage operatively connecting the fluid inlet, the pressure port, the bleed port, and the fluid outlet in fluid communication;
wherein the fluid passage is at least partially defined by a plurality of bores machined into the manifold housing, and interconnected in fluid communication to define a continuous fluid flow path;
a supply control valve mounted to and supported by the manifold housing, operable to open and close fluid communication through the fluid passage, and disposed between the fluid inlet and the fluid outlet to control fluid flow from the fluid inlet to the fluid outlet;
a bleed valve mounted to and supported by the manifold housing, operable to open and close fluid communication through the fluid passage, and disposed between the fluid inlet and the supply control valve;
wherein the pressure port is disposed between the supply control valve and the fluid outlet;
wherein the bleed port is disposed in fluid communication with the fluid passage, between the fluid inlet and the supply control valve;
wherein the bleed valve is disposed in fluid communication with the fluid passage, between the fluid inlet and the bleed port, to control fluid flow from the fluid inlet to the bleed port;
a pressure transducer coupled to the pressure port and operable to sense a fluid pressure in the fluid passage, at the pressure port, between the supply control valve and the fluid outlet; and
a manifold controller mounted to and supported by the manifold housing, and connected to and in electrical communication with the supply control valve, the bleed valve, and the pressure transducer, wherein the manifold controller includes all software and hardware necessary to control opening and closing of the supply control valve, control the opening and closing of the bleed valve, control the operation of the pressure transducer, and to communicate information sensed by the pressure transducer to a testing controller;
wherein the manifold controller includes a first, 2-amp digital output interconnecting the manifold controller and the supply control valve, wherein the first, 2-amp digital output connecting the manifold controller and the supply control valve is operable to carry an electrical control signal having a current between 0.5 and 2 amps; and
wherein the manifold controller includes a second, 2-amp digital output interconnecting the manifold controller and the bleed valve, wherein the second, 2-amp digital output connecting the manifold controller and the bleed valve is operable to carry an electrical control signal having a current between 0.5 and 2 amps.

* * * * *